United States Patent [19]

Funston

[11] Patent Number: 4,688,099
[45] Date of Patent: Aug. 18, 1987

[54] ILLUMINATION CONTROL CIRCUITRY FOR A FILM VIDEO PLAYER ELECTRONIC STROBE LIGHT

[75] Inventor: David L. Funston, Batavia, N.Y.

[73] Assignee: Eastman Kodak Company, Rochester, N.Y.

[21] Appl. No.: 948,386

[22] Filed: Dec. 19, 1986

Related U.S. Application Data

[63] Continuation of Ser. No. 742,358, Jun. 7, 1985, abandoned.

[51] Int. Cl.$^4$ .................. H04N 3/40; H04N 5/253; H04N 9/11
[52] U.S. Cl. ..................................... 358/214; 358/54
[58] Field of Search .................... 358/54, 214, 228

[56] References Cited

U.S. PATENT DOCUMENTS

| | | | |
|---|---|---|---|
| 3,637,937 | 1/1972 | Deveson et al. | 358/27 |
| 4,037,254 | 7/1977 | Monahan | 358/228 |
| 4,050,085 | 9/1977 | Prince et al. | 358/228 |
| 4,485,405 | 11/1984 | Bailey | 358/228 |
| 4,495,516 | 1/1985 | Moore et al. | 358/54 |
| 4,594,614 | 6/1986 | Frank et al. | 358/214 |
| 4,598,322 | 7/1986 | Atherton | 358/228 |
| 4,623,929 | 11/1986 | Johnson et al. | 358/214 |

FOREIGN PATENT DOCUMENTS 3436057 5/1985 Fed. Rep. of Germany.
2149264 6/1985 United Kingdom.

*Primary Examiner*—James J. Groody
*Assistant Examiner*—Randall S. Svihla
*Attorney, Agent, or Firm*—Dennis P. Monteith

[57] ABSTRACT

A film video player includes an electronic strobe light operable for repetitively firing a flash tube to flash illuminate a solid state image sensor via a pulse of light projected via a photographic film during the vertical retrace interval of a standard television signal. Detector circuitry, responsive to a signal relating to an output of the image sensor, produces a control signal that is functionally related to whether or not the illumination of the image sensor is above, below, or within a predetermined range near the saturation level of the image sensor. A microprocessor adjusts an exposure level signal at the vertical retrace rate in accordance with the control signal. Logic switching circuitry, having an input coupled to the microprocessor and responsive to the exposure level signal and an output coupled to the electronic strobe light, causes the electronic strobe light to produce a pulse of light within each vertical retrace interval that is sufficient to illuminate the image sensor near its saturation level, without the illumination saturating the sensor, to optimize the signal-to-noise ratio of the image sensor. The amplitude of the flash-firing current through the electronic strobe light is adjusted to be one of two discrete levels, and the duration of the light pulse is adjusted to be greater than a minimum duration below which the energy of the light pulse cannot accurately be repeated, and less than the vertical retrace interval. Five stops of exposure variation in the photographic film can be accommodated.

6 Claims, 6 Drawing Figures

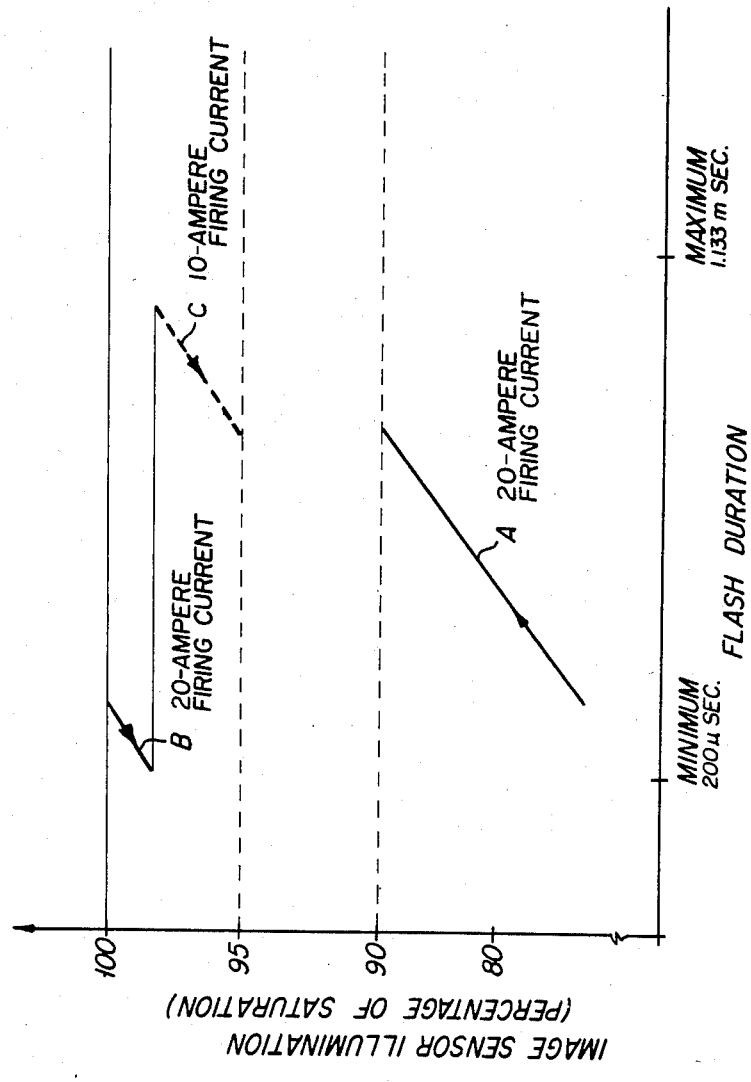

ILLUMINATION CONTROL CIRCUITRY FOR A FILM VIDEO PLAYER ELECTRONIC STROBE LIGHT

This is a continuation of application Ser. No. 742,358, filed June 7, 1985 now abandoned.

BACKGROUND OF THE INVENTION

CROSS-REFERENCE TO RELATED APPLICATIONS

Reference is hereby made to:

(1) U.S. patent application Ser. No. 596,868, entitled FILM VIDEO PLAYER WITH ELECTRONIC STROBE LIGHT by L. Frank et al., filed on Apr. 4, 1984, now U.S. Pat. No. 4,594,614 and (2) U.S. patent application Ser. No. 730,029, entitled FLASH TUBE SIMMER CIRCUITRY FOR A FILM VIDEO PLAYER ELECTRONIC STROBE LIGHT by D. Johnson et al., filed on May 3, 1985, now U.S. Pat. No. 4,623,929, issued Nov. 18, 1986.

1. Field of the Invention

The present invention relates to an illumination control system for use as part of a film video player. More particularly, the invention relates to illumination control circuitry for a quenchable electronic strobe light of the film video player.

2. Description Relative to the Background Art

A film video player is known in the art for displaying on a video monitor color images recorded on a color negative photographic film. The film video player includes a solid state image sensor which is illuminated by a pulse of high-intensity light transmitted through the color negative during the vertical retrace interval of a standard television signal.

With many commercially available photographic cameras, particularly low-cost cameras of simple design, the camera exposure control apparatus is not capable of regulating the amount of exposure light precisely to provide a nominally "correct" exposure of the film. Even with more expensive cameras having highly sophisticated exposure control apparatus for precise control of an exposure, a photographer may actually choose to overexpose or underexpose the film to achieve a special effect.

During a photographic printing operation, the exposure latitude of film can be relied upon, if desired, to produce an acceptable photographic print from a negative that has been exposed at a level other than the "correct" amount. For example, with the well known Kodacolor film manufactured by Eastman Kodak Company of Rochester, N.Y., acceptable photographic prints can be produced from negatives having down to three stops of underexposure and up to two stops of overexposure. Whatever the reason for the actual level of exposure, it is anticipated that any particular film negative for use with a film video player will have an average overall density which falls within a range, encompassing the density of a 'correct' exposure, of about 5 stops of exposure variability.

To provide a high quality video image, two requirements are placed upon the illumination system of a film video player. First, sufficient flash light is needed, without the flash saturating the image sensor, to provide a high-strength signal at the output of the sensor to enhance the quality of the video display. Accordingly, a desirable feature of the film video player is that its flash illumination system have at least a 5-stop variability in flash output to optimize the signal-to-noise ratio of the image sensor. Second, the flash-to-flash sensor illumination or energy must remain relatively invariant to provide a flicker-free video signal.

U.S. Pat. No. 4,495,516, which is assigned to the assignee of the present invention, discloses a film video player in which photosignals are read out in the dark to avoid smearing the image signal produced by a CCD image sensor. The pulsed light source comprises a quartz halogen projection lamp, the light output of which is chopped by a spinning shutter disc. Although the light source produces adequate sensor illumination with excellent pulse-to-pulse uniformity and constant color temperature, the chopped light source is mechanically complex and consumes a considerable amount of energy, requiring substantial cooling.

U.S. Pat. No. 4,495,516 further discloses that the pulsed light source may comprise an electronic strobe light such as a Xenon flash. A film video player with an electronic strobe flash light provides several advantages over a film video player having a quartz halogen projection lamp with a mechanical shutter. In particular, the strobe light provides reduced mechanical complexity and lower power consumption, resulting in lower heat generation and, consequently, reduced cooling requirements.

A film video player having a conventional electronic strobe light as the pulsed light source, however, produces a television signal having an annoying flicker. A measure of the flicker produced from a variety of flash tubes powered with a conventional strobe light circuit indicates that the average flash-to-flash variation in light output is on the order of one stop (0.3 log E).

The aforementioned copending U.S. patent application U.S. Ser. No. 596,868, filed Apr. 4, 1984, discloses and claims a high-voltage power supply which produces a substantially constant flash tube firing current for each flash-firing operation. The firing current flows to ground through a power FET, which is controlled at the vertical retrace rate by a light-dependent signal corresponding to the intensity of the flash light. With this arrangement for controlling the flash tube firing current, flash-to-flash variations from the light source are greatly reduced.

The maximum duration of the light pulse of the film video player is limited by the vertical retrace interval (1.28 milliseconds), to avoid the smearing of the image signal during readout. It has been found through laboratory testing of a variety of electronic strobe lights that the minimum duration of the light pulse, on the other hand, is limited to about 200 microseconds ($\mu$s). For shorter intervals, it has not been possible to accurately control the repeatability of the flashes. This is because of such factors as flash tube afterglow and inherent capacitance effects which limit the ability of the strobe light electronics to produce and to respond to a flash-quenching signal at the precise point in time from flash to flash. Thus, the illumination pulse for each video field must be less than a vertical retrace interval, with a minimum duration of at least about 200 $\mu$s, while still providing sufficient illumination so that the output of the image sensor is a high-strength signal.

Although the high voltage circuitry of the above mentioned patent application has been found to work well in the eliminating of flash-to-flash variations in the electronic strobe light, its useable light output is limited to about three stops of exposure range within each vertical retrace interval. Accordingly, this limitation prevents the operation of the image sensor at an optimum signal-to-noise ratio for the full range of anticipated film negatives.

SUMMARY OF THE INVENTION

In view of the foregoing, it is an object of the invention to provide a flicker-free illumination system for a film video player that produces a high-resolution television signal in which the signal-to-noise ratio at the output of a solid state image sensor of the video player is optimized over a full range of densities anticipated for a given film negative. This object is achieved for an electronic strobe light for a film video player having a detector for producing a control signal related to the illumination of the image sensor, and circuit means, responsive to the control signal, for causing the electronic strobe light to project a substantially constant amount of flash light, via the photographic negative, to illuminate the image sensor within a predetermined percentage near its saturation level, to optimize the signal-to-noise ratio of the sensor. Because the illumination of the image sensor is near a maximum, without the illumination saturating the sensor, the signal-to-noise ratio of the image sensor is optimized, regardless of the density of the photographic negative. Furthermore, because a substantially constant amount of flash light is used to illuminate the image sensor, not only is the signal-to-noise ratio of the image sensor optimized over the full range of densities anticipated for a given film negative, but the video signal is flicker-free.

In a preferred embodiment, the film video player includes an electronic strobe light operable repetitively for flash illuminating the image sensor via a substantially constant pulse of light projected onto a photographic negative at the vertical retrace rate of a standard television signal. In accordance with the invention, a detector is responsive to a signal relating to an output of the image sensor for producing a control signal that is functionally related to whether or not the illumination of the image sensor is above, below, or within a predetermined range of percentages near the saturation level of the image sensor. An electronic computing means, responsive to the control signal, serves to adjust an exposure level signal at the vertical retrace rate as a function of whether the output of the image sensor is above or below the predetermined range. A logic switching means, having an output coupled to the electronic strobe light and an input coupled to the computing means and responsive to the exposure level signal, causes the electronic strobe light to produce a substantially constant amount of light within each vertical retrace interval in accordance with the exposure signal, to provide, by way of the photographic negative, an illumination of the image sensor that is within the predetermined range near the saturation level of the image sensor.

In the preferred embodiment of the invention, the detector is operated to produce a control signal that indicates whether the sensor illumination is within a range of between ninety to ninety-five percent of the saturation level of the image sensor. When the sensor illumination is outside this range, either above or below, the electronic computing means, by way of the logic switching means, causes an adjustment of the light output of the electronic strobe light, so that the flash exposure of the image sensor is brought within ninety to ninety-five percent of the sensor's saturation level. Thus, the signal-to-noise ratio of the image sensor can be maintained at a relatively high level, without saturating the image sensor, to facilitate the processing of its image signal.

The invention and its other advantages will become more apparent in the detailed description of a preferred embodiment presented below.

DESCRIPTION OF THE DRAWINGS

The invention will be described with reference to the accompanying drawings, wherein;

FIG. 6, which is useful in explaining the operation of the invention, illustrates variations in illumination of the image sensor with flash duration.

DETAILED DESCRIPTION OF A PREFERRED EMBODIMENT

Figure 1:
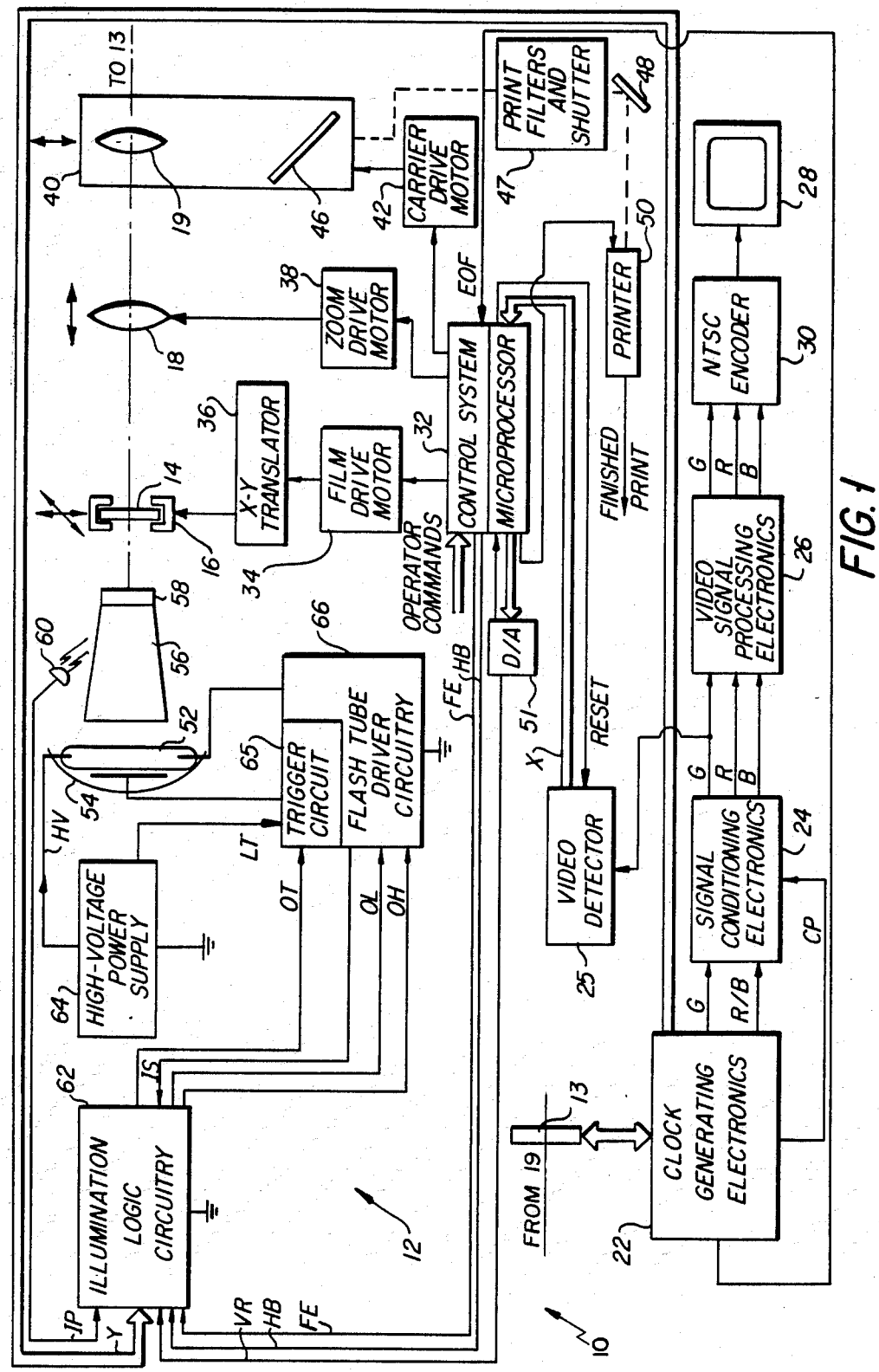
FIG. 1 is a schematic of a film video player/printer having an electronic strobe light according to the present invention.

FIG. 1 shows a film video player/printer 10 having an electronic strobe light 12, according to the present invention. The strobe light 12 serves to periodically illuminate a solid state charge coupled device (CCD) image sensor 13 via flash light projected onto a color negative photographic film 14 located in a moveable film gate 16. A zoom lens 18 projects an image of the illuminated film 14 via a taking lens 19 onto the image sensor 13. Clock generating electronics 22 serve to control the CCD sensor 13 and to process its output signals to produce in a known manner a video signal corresponding to the film image.

The solid state CCD image sensor is of the type wherein photosignals are produced directly in charge transfer registers (not shown). To maximize the area available for photosensing, no light shielded frame storage area is provided on the sensor, thereby requiring that the sensor be flash exposed and then read out in the dark. The image sensor 13 is exposed by the strobe light 12 during the vertical retrace interval of the standard television signal and is read out in the dark at the standard video rate.

In a preferred embodiment, the image sensor 13 includes an overlay comprising an array of parallel columns of color filters. Green (G) filter stripes form the odd-numbered columns of the array, and alternating red (R) and blue (B) filter stripes form the even-numbered columns. To reduce readout clock frequencies, the image sensor 13 includes a pair of parallel output registers which are coupled respectively to the even-numbered and odd-numbered columns of the array. Thus, the output of one of the registers corresponds to a green video signal, and the output of the other register corresponds to a time-division multiplexed signal consisting of a blue video signal and a red video signal. A CCD image sensor of the aforementioned type is disclosed in the aforementioned U.S. Pat. No. 4,495,516, assigned to the assignee of the present invention, the disclosure of which is incorporated herein by reference.

Signal conditioning electronics 24 serve to amplify the output signals of the clock generating electronics 22 to produce video signals corresponding to the green, red, and blue colors of the negative film 14. To that end, the signal conditioning electronics 24, under the control of timing and sampling pulses, CP, provided by the clock generating electronics 22, produces three output trains of voltage pulses corresponding respectively to the light level on each of the green, blue, and red photosites of the image sensor 13.

For that purpose, the signal conditioning electronics 24 include timing circuitry for demultiplexing the R/B output signal of the image sensor 13. Additionally, the signal conditioning electronics 24 include sample and hold circuitry, responsive to the sampling pulses CP of the clock generating electronics 22, so that adjacent pulses in each output train are contiguous (140 nanosecond pulses in the green signal and 280 nanosecond pulses in the red and blue signals).

A video detector 25 serves to produce a control signal, X, corresponding to the illumination of the image sensor 13. For that purpose, the input of the detector 25 is responsive to the green signal output of the signal conditioning electronics 24, as the green video signal alone approximates sensor illumination.

Video signal processing electronics 26 serve to invert the output signals of the signal conditioning electronics 24, to produce positive R, G, and B color signals. Furthermore, the electronics 26 include logarithmic and exponential amplifiers for processing the output signals of the signal conditioning electronics 24 to correct for the nonlinear response of photographic film to light and to correct for the nonlinear response of a video monitor 28, such as a standard television receiver, to voltage. Additionally, the video signal processing electronics 26 include color correction circuits in the form of a 3×3 matrix circuit interposed between the output of the logarithmic amplifiers and the input of the exponential amplifiers, to correct for cross talk between the three video signals. This cross talk is due primarily to the overlap of spectral absorptivity of film dyes (unwanted absorption) and an imperfect spectral response of the filter array of the image sensor 13.

A conventional NTSC encoder 30 receives the R, G, and B output signals of the video signal processing electronics 26 and provides a composite video signal for display on the video monitor 28.

A microprocessor-based control system 32 serves to control the film video player/printer 10 via input/output driver circuits (not shown). To that end, the control system 32, in response to commands from an operator during a film viewing mode, functions to cause (1) the film gate 16 to move laterally and vertically for cropping the image, and (2) the zoom lens 18 to move for magnifying and reducing the projected image. To that end, a film drive motor 34, preferably a stepper motor, in response to an output from the control system 32, drives an X-Y translator 36 to moveably position the film gate 16. Likewise, a zoom drive motor 38, also preferably a stepper motor, serves to drive the zoom lens 18.

Additionally, the control system 32, in response to a command from the operator initiating a photographic printing mode, functions to cause a carrier plate 40 to be driven relative to the optical path of the electronic strobe light 12. In so doing, a carrier drive motor 42, in response to an output from the control system 32, serves to control the carrier plate 40 so that the taking lens 19 is positioned in the optical path during the film viewing mode and the mirror 46 is positioned in the optical path during the photographic printing mode. The mirror 46 serves to deflect flash light projected via the photographic film 14 through print filters and a shutter, designated generally 47. A second deflecting mirror 48 receives the flash light passing through the print filters and shutter 47 and deflects the flash light onto the printing plane of a printer 50. The printer 50 includes a processing mechanism (not shown), under the control of the control system 32, for delivering a finished photographic print to a film video player/printer customer.

The control system 32 also serves for supplying input to the electronic strobe light 12 to produce a desired amount of flash light. To that end, the control system 32, under the control of its microprocessor, provides three inputs to the strobe light 12. First, a signal FE serves to enable the strobe light 12, to produce flash illumination. Second, a 1-bit digital control signal HB functions to control the intensity of the flash light. Third, an 8-bit digital word serves to control the duration of the flash pulse. For that purpose, a digital-to-analog (D/A) converter 51 receives the 8-bit word and provides a voltage VR to the electronic strobe light 12 corresponding to the magnitude of the 8-bit word.

The electronic strobe light 12 includes a xenon flash tube 52 positioned adjacent a reflector 54 arranged for directing light from the flash tube onto a light integrator 56, which is formed of a solid bar of transparent material. A diffuser 58 at the output of the integrator 56 functions to spread the light so that there are no illumination discontinuities over the film plane, as such discontinuities may result in either light or dark "bands" being visible on the video monitor 28. The diffuser 58 also serves to suppress the effect of minor scratches and blemishes on the film 14.

A photosensor 60, such as a photodiode, produces a light-dependent signal IP corresponding to the intensity of light from the flash tube 52. For that purpose, the photosensor 60 is positioned to receive light reflected from the surface of the diffuser 58. Because light reflected from the film 14 varies with the density of the negative, the photosensor 60 should be located or its viewing angle restricted so that light reflected from the film does not impinge on the photosensor.

Illumination logic circuitry 62, in response to the light-dependent signal IP provided by the photosensor 60 and the signals VR, HB, and FE supplied by the control system 32, functions to control the electronic strobe light 12 so that a desired, substantially constant amount of flash light is produced during each vertical retrace interval. To synchronize the firing of the flash pulses, the clock generating electronics 22 apply video synchronization signals, generally denoted Y, to the illumination logic circuitry 62. For the purpose of controlling the intensity and the duration of the flash light, the illumination logic circuitry 62 produces a pair of control signals OL and OH.

As is known in the electronic strobe light art, a flash tube filled with ionizable gas, such as xenon, produces light that is functionally related to current through the flash tube. The intensity of the light varies primarily with the amplitude of the current raised to a power that is approximately two. The electronic strobe light 12 includes a regulated high-voltage power supply 64 which serves to supply a substantially constant flash-firing current to the flash tube 52 during each flash-firing operation. To that end, the power supply provides a voltage, HV, which is sufficiently high for igniting an arc in the flash tube 52 in response to a flash tube triggering operation. Additionally, the power supply 64 functions to provide operating voltage, LT, to a flash tube trigger circuit portion 65 of flash tube driver circuitry 66. In a presently preferred embodiment of the electronic strobe light 12, the power supply 64 is of the type disclosed in the aforementioned U.S. Pat. No. 4,623,929, which is also assigned to the assignee of the present invention.

For the purpose of synchronizing the operation of the trigger circuit 65 with the vertical retrace rate, the trigger circuit 65 receives a flash tube trigger signal OT from the illumination logic circitry 62.

Flash tube driver circuitry 66 provides a path to ground for flash-firing current applied to the flash tube 52 by the power supply 64. To that end, the driver circuitry 66, in response to the control signals OL and OH supplied by the illumination logic circuitry 62, regulates the amplitude of the flash-firing current to control the intensity of the flash light.

As described with regard to the background art of a vilm video player, the electronic strobe light 12, for illuminating the solid state image sensor 13 by way of light projected via a photographic negative, must be capable of producing a desired amount of sensor-illuminating light via any one of a number of photographic negatives, each of which may have an average density corresponding to down to three stops of underexposure to up to two stops of overexposure. Furthermore, the image sensor 13 must be illuminated within a vertical retrace interval to avoid smearing the image signal during its readout.

In view of these operating constraints, the invention requires that the flash light of the film video player/printer 10 produce a high-resolution flicker-free television signal in which the signal-to-noise ratio at the output of the image sensor 13 is optimized over the full range of densities anticipated for a given film negative. To that end, the illumination system of the film video player/printer 10 provides sufficient illumination to drive the sensor 13 to between ninety and ninety-five percent (90 to 95%) of its saturation level. For that purpose, the invention, by means of the detector 25 and the microprocessor of the control system 32, measures the output of the sensor 13 and produces a word FLASH corresponding to the necessary amount of flash illumination.

Once the appropriate flash word has been determined, the illumination system provides a constant amount of flash illumination to provide a flicker-free video signal. For that purpose, the illumination logic circuitry 62, in response to the photosensor 60, integrates flash light projected upon the negative film 14 by the flash tube 52 and compares a signal corresponding to the integrated light with a signal corresponding to the flash word. The output of the flash tube 52 is controlled by this comparison.

Figure 2:
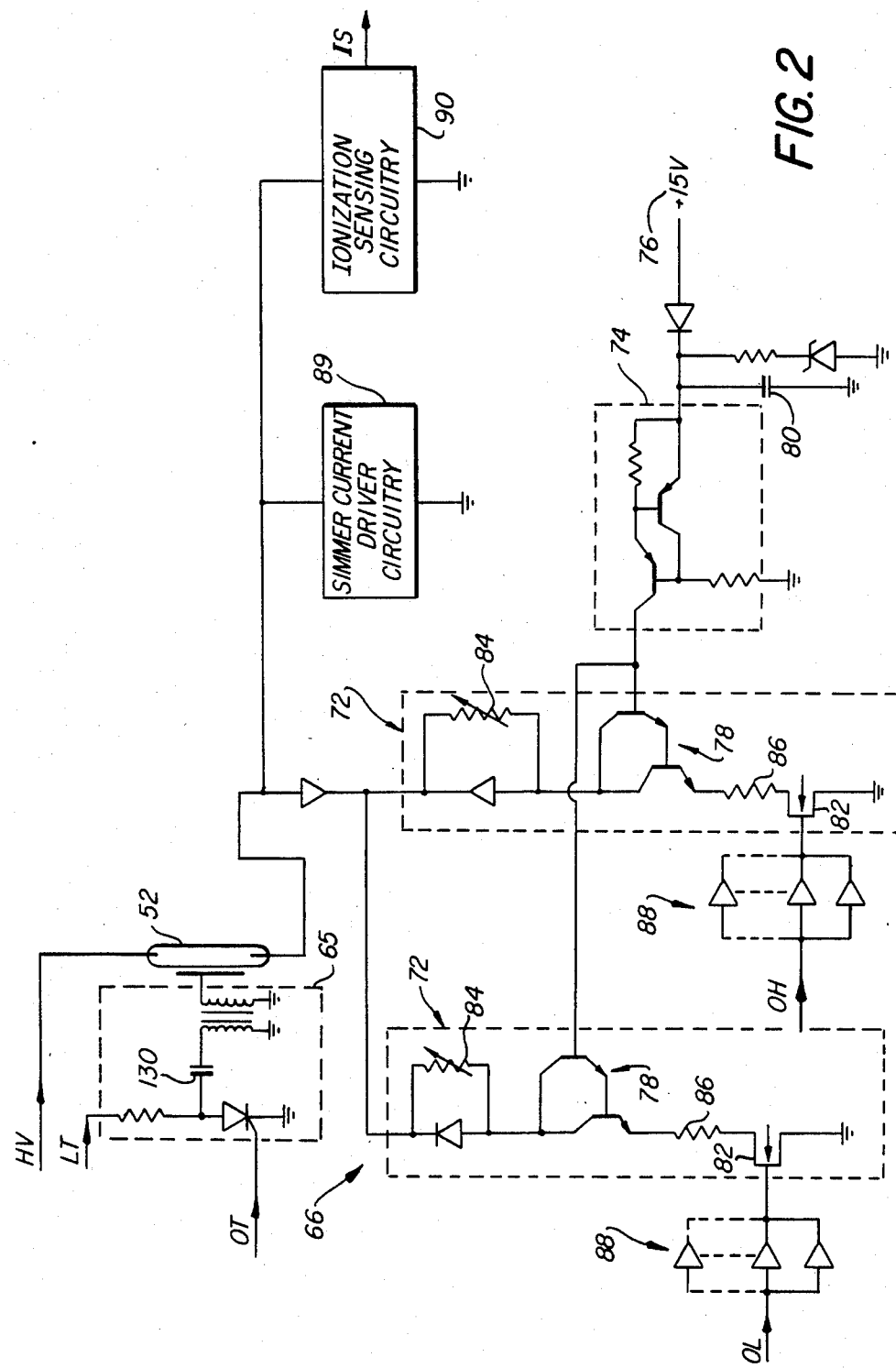
FIG. 2 is a schematic circuit diagram of a flash tube driver circuitry portion of the electronic strobe light.

For the purpose of adjusting the flash illumination, the flash tube driver circuitry 66, as shown in FIG. 2, includes an identical pair of parallel connected current driver circuits 72. The operating state of each circuit 72 is separately controlled to regulate the amplitude of the firing current through the flash tube 52 at either of two discrete levels. For that purpose, each current driver circuit 72 has the capability of drawing ten amperes of current through the flash tube 52 to ground during a flash-firing operation. Thus, when both of the circuits 72 are conducting, a total current of twenty amperes flows through the flash tube 52, thereby approximately quadrupling the intensity of the flash light compared to when only one of the circuits 72 is conducting. With this arrangement, the flash-firing current is regulated (1) at a relatively high level to produce high-intensity flash light for negatives of medium to high density, and (2) at an intermediate level, to produce flash light of intermediate intensity for negatives of relatively low to medium density.

Current-limiting circuitry 74 serves to limit the base drive current that a 15-volt source 76 supplies to a Darlington stage 78 of each circuit 72. By limiting the base current, the current-limiting circuitry 74 protects each Darlington stage 78 against excessive loading. The 15-volt source 76 further functions to control the voltage at the output of each Darlington stage 78 at a given level which is approximately fifteen volts minus about four diode voltage drops. A snubber capacitor 80 serves to limit voltage fluctuations of the source 76 at the input of the current-limiting circuitry 74, thereby further facilitating the control of the output voltage of each Darlington stage 78 at a given level.

An N-channel power MOSFET 82 of each circuit 72 connects the flash tube 52 to ground through a variable power-dissipating resistor 84 serially connected to the corresponding Darlington stage 78 and a current-setting resistor 86. A pair of banks of parallel connected CMOS buffers 88, responsive respectively to the control signals OL and OH supplied by the illumination logic circuitry 62, provides fast turn on and turn off of the corresponding MOSFET 82. Each resistor 86 serves to establish the current through its corresponding circuit 72 at the aforementioned ten amperes, as that current is determined by the output voltage of the corresponding Darlington stage 78 minus the voltage across the MOSFET 82, divided by the value of the resistor 86. Each resistor 84, on the other hand, serves to reduce the voltage across the corresponding Darlington stage 78 to limit the amount of power dissipated in the Darlington.

The relatively high voltage pulse which the trigger circuit 65 produces to trigger the electronic strobe light 12 into conduction can produce electromagnetic interference which may adversely affect radiated communication signals. Because of this potential problem, the flash tube driver circuitry 66 further includes simmer current driver circuitry 89, which serves to draw a flash tube simmer current between flash pulses to sustain a low-level arc in the flash tube 52. With a simmer current, there is no need to produce a triggering pulse to trigger the flash tube 52 into conduction each time a flash pulse is to be produced. To that end, the driver circuitry 89 limits the simmer current to about 125 milliamperes to produce an arc which is insufficient to cause a smearing of the image signal during readout of the image sensor 13.

It has not been possible, however, to reliably maintain a continuous simmer current of a magnitude that keeps the arc of the flash tube 52 at a low enough level to avoid the smearing of the image signal during readout of the image sensor 13. Accordingly, the flash tube driver circuitry 66 includes ionization sensing circuitry 90 for sensing whether or not an arc is present in the flash tube 52, and to provide to the illumination logic circuitry 62 a logic level voltage IS which indicates whether a flash tube arc exists (simmer current is flowing). In a presently preferred embodiment of the electronic strobe light 12, the simmer current driver circuitry 89 and the ionization sensing circuitry 90 are of the type disclosed in the aforementioned U.S. patent application Ser. No. 730,029, filed May 3, 1985, the disclosure of which is incorporated herein by reference.

With a photographic negative, scene highlights—the most important areas of a photographic picture—occur in the darkest areas of the negative, whereas dark portions of a scene, such as shadows, are in the lightest areas of the negative. Thus, the output of the image sensor 13 includes relatively low-level signals corresponding to scene highlights and relatively high-level signals corresponding to dark scene portions.

Proper illumination of the image sensor 13 is important, of course, to emphasize scene contrast. Proper sensor illumination is also important to enhance the signal-to-noise ratio of the image sensor 13, particularly for the purpose of raising the image signal corresponding to scene highlights above the noise of the sensor.

In view of the foregoing, the invention also requires that the electronic strobe light 12 of the film video player 10 be fired to optimize the signal-to-noise ratio of the image sensor 13 without the illumination saturating the sensor. To that end, the video detector 25 operates to provide an output X at the video field rate that indicates whether or not the illumination impinging on the image sensor 13 for each video field is within the aforementioned range of ninety to ninety-five percent of the saturation level of the sensor 13. More specifically, the output of the detector 25 indicates whether the illumination on the image sensor 13 is above, below, or within this ninety to ninety-five percent range.

Figure 3:
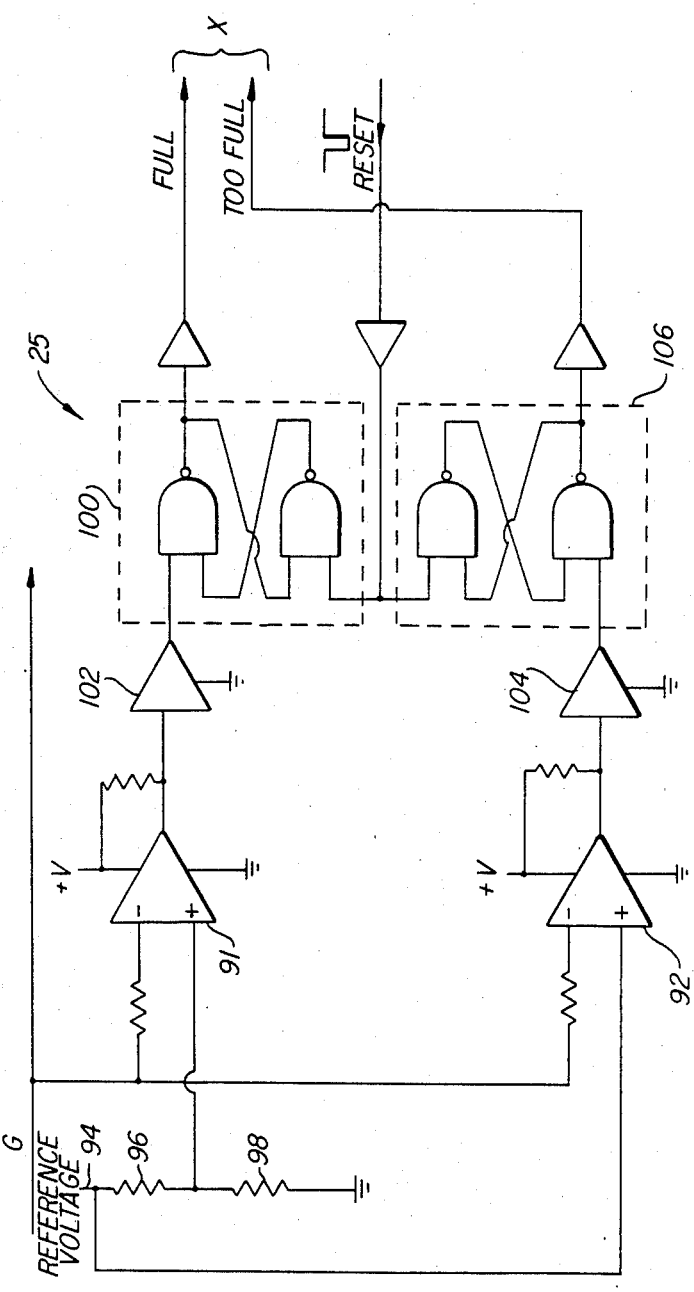
FIG. 3 is a circuit schematic of a detector circuit associated with a solid state image sensor of the film video player/printer.

As shown in FIG. 3, the input of the detector 25 includes a pair of parallel connected voltage comparators 91 and 92. A reference voltage 94 provides a fixed voltage at the non-inverting input terminal of the comparator 92 corresponding to a video signal that is produced when the image sensor 13 is illuminated at ninety-five percent (95%) of its saturation level. A pair of serially connected resistors 96 and 98 form a voltage divider between the reference voltage 94 and ground to provide a fixed voltage at the non-inverting input terminal of the comparator 91 corresponding to a video signal that is produced when the image sensor 13 is illuminated at ninety percent (90%) of its saturation level.

In addition to the fixed voltages, each of the comparators 91 and 92 receives at its inverting input terminal the green video signal from the signal conditioning electronics 24 and produces a control signal which is high so long as the green video signal is less than the corresponding fixed voltage and which is low when any of the pulses of the green signal is greater than the fixed voltage.

A latch 100, which receives the output of the comparator 91 through a buffer 102, serves to produce a latched logic one level output signal FULL if the output of the comparator 91 goes low. Thus, the latch 100 produces the digital control signal FULL if any one or more of the pulses of the green video signal is greater than 90% of the maximum output of the image sensor 13.

Similarly, a latch 106, which receives the output of the comparator 92 through a buffer 104, provides a latched logic one level output signal, TOO FULL, if the output of the comparator 92 goes low. Thus, the latch 106 produces the digital control signal TOO FULL if any one or more of the pulses of the green video signal is greater than 95% of the maximum output of the image sensor. Together the FULL and TOO FULL signals form the aforementioned signal X supplied to the microprocessor of the control system 32.

Further toward the optimization of the signal-to-noise ratio of the image sensor 13, the microprocessor of the control system 32 is programmed to compute, in real time at the start of the viewing of a given negative film 14, a program variable FLASH corresponding to a desired amount of flash illumination for the next video field. To this end, the clock generating electronics 22 of FIG. 1 supplies to the microprocessor an end of field signal EOF at the completion of the readout of the previous field of the image sensor 13.

Figure 4:
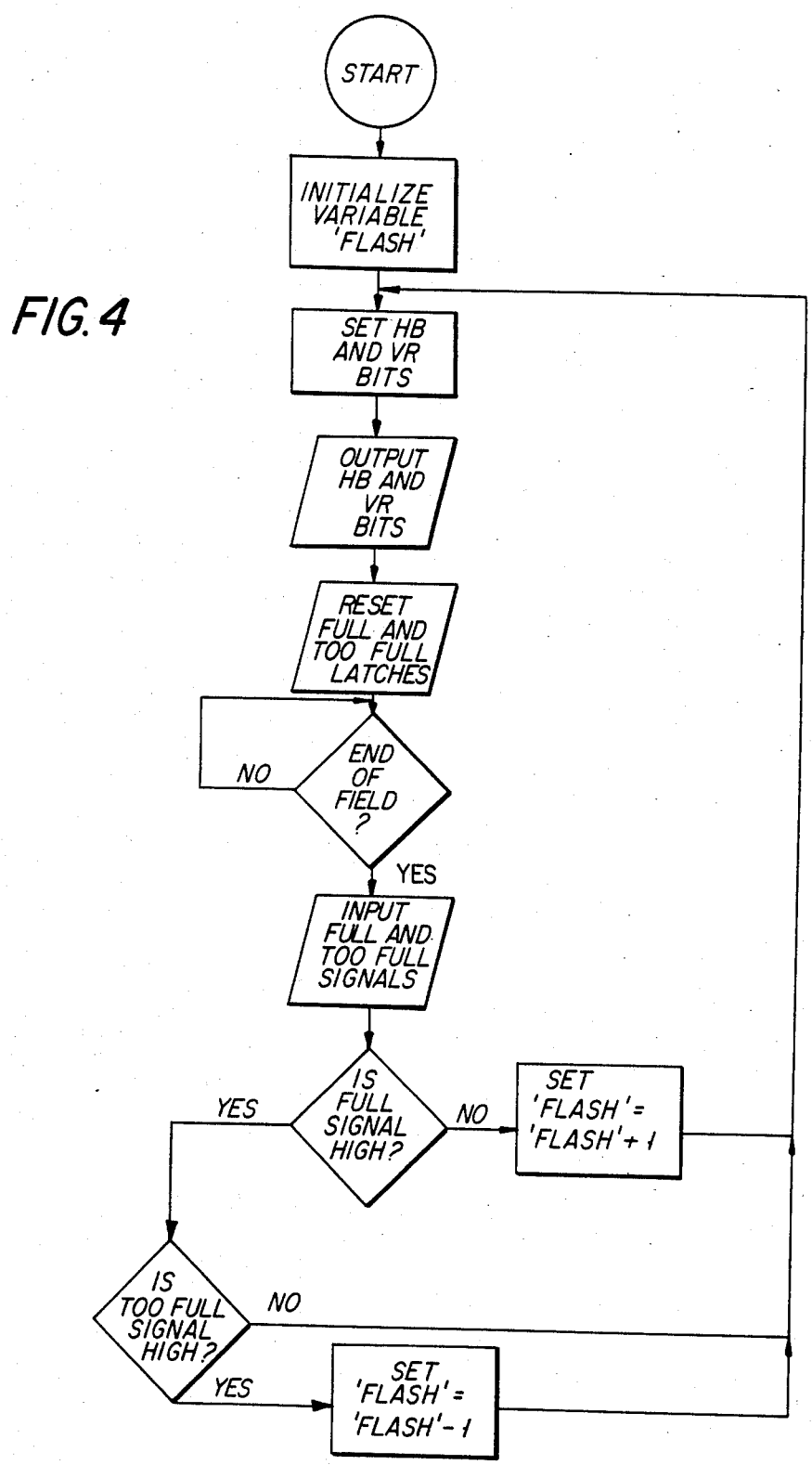
FIG. 4 is a flowchart of a computer program of a control system of the film video player/printer.

As shown in the computer flowchart of FIG. 4, the microprocessor of the control system 32, under timing provided by the signal EOF, receives as inputs the FULL and TOO FULL signals from the outputs of latches 100 and 106, respectively. With those inputs, the microprocessor, under the control of its program, decrements the previous value of the variable FLASH by one whenever the output of the image sensor 13 is above ninety-five percent of the saturation level of the sensor. Similarly, the microprocessor increments the variable FLASH by one when the sensor's maximum output is below ninety percent of its saturation level.

The variable FLASH is a number which is updated during each vertical retrace interval until the necessary amount of illumination is driving the sensor 13 to optimize its signal-to-noise ratio. In so doing, the number represented by FLASH may vary between a minimum value, which corresponds to low-intensity flash illumination of a minimum duration of approximately 200 $\mu$s, to a maximum value, which corresponds to high-intensity flash illumination of a maximum duration of approximately 1.133 ms. When the variable FLASH is less than a value at the middle of the range over which it may vary, the microprocessor, under the control of its program, sets the 1-bit control signal HB at a logic zero level and loads an 8-bit output register (not shown) with eight bits of data corresponding to the magnitude of FLASH. When the variable FLASH is greater than this mid-range value, on the other hand, the microprocessor sets the 1-bit control signal HB at a logic one level and loads the 8-bit output register with eight bits of data corresponding to the magnitude of the variable FLASH minus the mid-range value. After its output is provided, the microprocessor resets the latches 100 and 106.

The illumination logic circuitry 62 serves to control the operation of the flash tube driver circuitry 66 at the vertical retrace rate to cause the production of flash illumination in accordance with the signal HB and the voltage VR, as provided by the microprocessor of the control system 32. To this end, the clock generating electronics 22 of FIG. 1 supply the video synchronization signals Y to the illumination logic circuitry 62. Those synchronization signals include (1) a power supply clock signal PC and (2) a trigger control signal FT. The clock signal PC, which is normally high, goes low momentarily approximately 500 microseconds ($\mu$s) prior to the end of each vertical field. The trigger control signal FT goes from a low condition to a high condition at the beginning of each vertical retrace interval and remains high for about 1.133 milliseconds.

Figure 5:
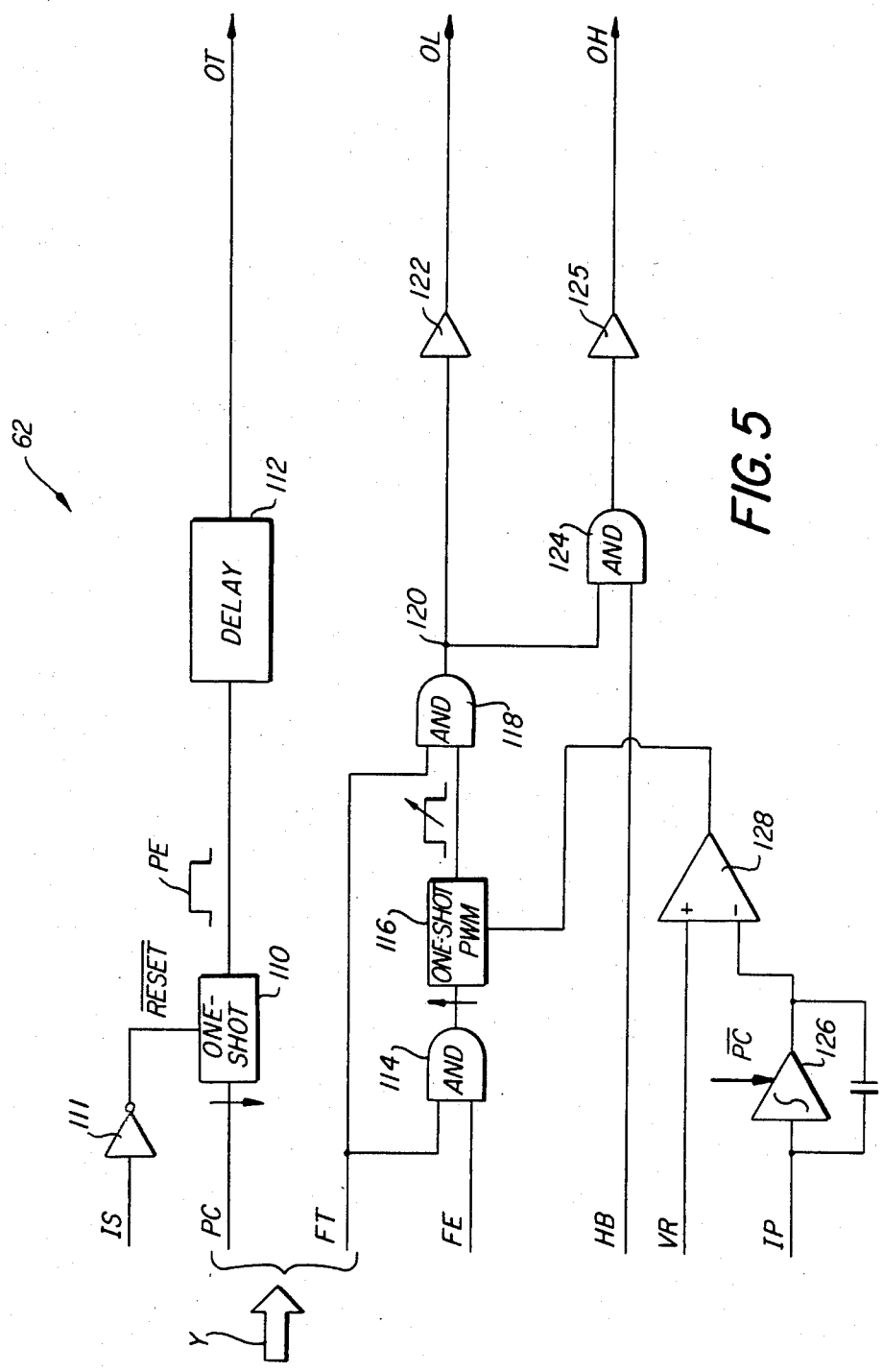
FIG. 5 is a block diagram of an illumination logic circuitry portion of the electronic strobe light.

As shown in FIG. 5, the illumination logic circuitry 62 includes a monostable multivibrator (one-shot) 110 which, under timing provided by the negative-going transition of the clock signal PC, produces a trigger circuit enable signal PE. The signal PE has a fixed duration of approximately 375 μs. An inverter 111, which receives the logic level voltage IS from the ionization sensing circuitry 90 of FIG. 2, controls the operation of the one-shot 110. The inverter 111 serves to enable the one-shot 110 for operation in response to the signal PC only when the voltage IS indicates that simmer current is off. In so doing, because of the timing provided by the clock signal PC, when the simmer current is off the trigger circuit enable signal PE undergoes its negative-going transition prior to the end of a video field.

A delay circuit 112, which receives the signal PE from the one-shot 110, provides a suitable delay to produce the flash tube trigger pulse OT in synchronism with the vertical retrace interval. The flash tube trigger pulse OT is a fixed pulse of approximately 30 μs.

A dual-input AND gate 114 of the illumination logic circuitry 62 receives the trigger control signal FT from the clock generating electronics 22 and the flash enable signal FE from the control system 32. Thus the AND gate 114 serves to provide a logic one level output during each vertical retrace interval that a flash pulse is to be produced.

A resettable one-shot 116 produces an output pulse in response to a positive-going transition of the output of the AND gate 114. The one-shot 116 functions as a pulse width modulator (PWM) which serves to produce a variable width output pulse during each vertical retrace interval that a flash pulse is required. The width of each pulse corresponds to the duration of the pulse of flash illumination. Because the film 14 must be illuminated during the vertical retrace interval, the one-shot 116 is arranged so that the maximum width of its output pulse is limited to 1.133 milliseconds (ms). That time is slightly less than a full vertical retrace interval, to allow time for the light output of the flash tube 52 to decay prior to the end of each retrace interval.

An AND gate 118 receives the output of the one-shot 116 and provides at the junction 120 a logic one level output so long as the output of the one-shot 116 remains high while FT is high or vice versa. The AND gate 118 serves two functions. First, the gate 118 causes an output buffer 122 to provide the aforementioned flash-firing control signal OL during each interval retrace interval that a flash pulse is desired. Second, the gate 118 serves to provide a drive signal to a dual-input AND gate 124.

The operation of the gate 124 is controlled in accordance with the state of the 1-bit control signal HB supplied by the microprocessor of the control system 32. The AND gate 124, via an output buffer 125, serves to provide the aforementioned control signal OH during each vertical retrace interval that the signal HB is high.

An integrator 126 and a comparator 128 serve to provide a constant amount of flash illumination once the appropriate value for the program variable FLASH has been determined. In so doing, the integrator 126 receives the light-dependent signal IP from the photosensor 60 and produces an output corresponding to the cumulative amount of light impinging on the photosensor. Immediately prior to each vertical retrace interval, the output of the integrator 126 is set to zero (by means not shown) in response to the negative-going transition of the signal PC.

The comparator 128 receives as inputs the voltage VR from the D/A converter 51 and the integrated signal from the output of the integrator 126 and produces a flash control signal which is high whenever the integrated signal is less than the voltage VR and which is low when the integrated signal is greater than VR. The output pulse of the one-shot 116 is terminated when the output of the comparator 128 assumes a low condition or when the one-shot 116 times out at 1.133 ms.

The pulse width of the output of the one-shot 116 is normally controlled by the output of the comparator 128. The signal FT limits the maximum length of the pulse at the output of the AND gate 118. The one-shot 116, however, will go low no later than 1.133 ms, and thereby causes the output of the gate 118 to return to a low level should the signal FT fail to go low.

In view of the foregoing, the operation of the film video player/printer 10 with the electronic strobe light 12 will now be described with particular reference to the drawings.

When an operator turns the film video player/printer 10 on (by means not shown), a 60-Hz source of line voltage (also not shown) immediately charges the high-voltage power supply 64 of FIG. 1 and a trigger capacitor 130 of the flash tube trigger circuit 65 of FIG. 2.

To regulate the initial firing of the electronic strobe light 12, the microprocessor of the control system 32 initializes the program variable FLASH at a predetermined value. In a preferred embodiment of the invention, the initial value selected for the program variable FLASH is greater than the aforementioned mid-range value. Thus, the microprocessor sets the signal HB at a logic one level and loads its output register with eight bits corresponding to the difference between the initial value of FLASH and the mid-range value. The D/A converter 51 receives the contents of the output register and provides the voltage VR, which is linearly proportional to the magnitude of the eight bits.

The signal HB enables the AND gate 124 of the illumination logic circuitry 62 of FIG. 5. Additionally, with no current through the flash tube 52 as yet, the voltage IS is at logic zero level. At this level, the inverter 111 enables the one-shot 110 of the illumination logic circuitry 62.

Approximately 500 μs before the vertical retrace interval of a standard television signal, the power supply clock signal PC, which is provided by the clock generating electronics 22, goes low momentarily (approximately 63.5 μs). With the one-shot 110 enabled, the one-shot 110 produces the trigger circuit enable signal PE in response to the negative-going transition of the signal PC.

The signal PE is approximately 375 μs long. In response to the signal PE, the delay circuit 112 provides a suitable delay to supply the flash tube trigger signal OT in synchronism with the beginning of the vertical retrace interval.

By way of electronic switching means (not shown) connected to the integrator 126 and responsive to the signal PC assuming its low level condition, the output of the integrator 116 is initialized to zero. With the output of the integrator below the voltage VR, the output of the comparator 128 is high, which enables the one-shot 116.

At the beginning of each vertical retrace interval, the trigger control signal FT, which is also provided by the clock generating electronics 22, goes high for 1.133 ms. The AND gates 114 and 118 are therefore also enabled at the start of the initial vertical retrace interval.

When a flash pulse is desired, the control system 32 supplies the flash enable signal FE to the AND gate 114. Normally, the signal FE has a slight delay relative to the trigger control signal FT, because of the real time calculations by the microprocessor of the data corresponding to the signal HB and the voltage VR. With the one-shot 116 enabled, the AND gate 114, in response to the signal FE, causes the output of the one-shot 116 to go high. The AND gate 118 receives the output of the one-shot 116 and produces a logic one level signal.

In response to the logic one level signal at the output of the AND gate 118, the buffer 122 provides the control signal OL. Additionally, the buffer 125, by way of the AND gate 124, provides the control signal OH.

Accordingly, the power MOSFETs 82 of the flash tube driver circuitry 62 of FIG. 2 receive respectively the signals OL and OH through the buffers 88, and thereby turn on. When this happens, each of the driver circuits 72 provides the flash tube 52 with a low impedance path to ground.

When the flash tube trigger signal OT activates the trigger circuit 65, the trigger capacitor 130 discharges, which triggers the flash tube 52 into conduction. With both the power MOSFETs 82 on, the power supply 64 discharges through the flash tube 52 and both of the current driver circuits 72 to ground. Thus, twenty amperes of current flow initially through the flash tube 52, to produce a relatively high intensity pulse of illumination.

The photosensor 60 senses flash light reflected from the diffuser 58 and supplies its light-dependent signal IP to the integrator 126. The output of the integrator 126 rises steadily at a rate proportional to the amplitude of IP.

The output of the comparator 128 goes low when the output of the integrator 126 rises to the voltage VR supplied by the D/A converter 51. In response to the negative-going transition at the output of the comparator 128, the output of the one-shot 116 goes low. When this happens, the output of the AND gate 18 goes low, which in turn drives the output of the AND gate 124 low.

In response to the negative-going transitions at the respective outputs of the AND gates 118 and 124, the control signal OL at the output of the buffer 122 and the control signal OH at the output of the buffer 125 go low. As this happens, both of the power MOSFETs 82 of the flash tube driver circuitry 62 turn off, which quenches the flash tube 52 and thereby extinguishes the illumination of the film 14 and the image sensor 13.

During readout of the image sensor 13 under the control of the clock generating electronics 22, the video detector 25 of FIG. 3 receives the green video signal from the output of the signal conditioning electronics 24. If, during the readout of the entire video field, the amplitude of any one of the output voltage pulses in the green signal corresponds to a level of illumination which is greater than 90% of the illumination required to saturate the image sensor 13, the latch 100 produces the signal FULL at its output. Similarly, if the amplitude of any one of the green pulses corresponds to illumination greater than 95% of the saturation level of the sensor 13, the latch 106 produces the signal TOO FULL.

In response to the end of field signal EOF provided by the clock generating electronics 22, the microprocessor, under the control of its program, updates the program variable FLASH in accordance with the respective outputs of the latches 100 and 106. As shown in the flowchart of FIG. 4, when the peak illumination of the image sensor 13 is less than 90% of its saturation level, the variable FLASH is incremented by one. Conversely, when the peak illumination of the sensor 13 is greater than 95% of saturation, the variable FLASH is decremented by one. Otherwise, no change is made to the program variable FLASH when the illumination of the sensor 13 is within the desired range of 90 to 95% of its saturation level.

After the logical decisions and arithmetic calculations are made at the end of the readout of the initial video field, the microprocessor initiates a subsequent flash-firing operation by providing the signal FE, the signal HB, and the eight bits representing the voltage VR based upon the updated value of the variable FLASH.

Assume that the density of the film negative 14 is relatively high, and thereby prevented sufficient illumination (below 90%) of the image sensor 13 based upon the initial value of the program variable FLASH. In this situation, the microprocessor increments the variable FLASH by one. With the signal HB already set at a logic one level, the number represented by the eight bits loaded into the output register increases by one. Thus, the D/A converter 51 increases the voltage VR by a corresponding amount. As a result, the next flash pulse is again produced with a 20-ampere firing current and, therefore, has the same intensity as the original flash. However, with a slightly longer flash pulse due to the larger value of VR, a greater amount of illumination is produced.

The above-described flash-firing sequence is repeated during each vertical retrace interval of a standard television signal until the flash pulse progressively increases to a point at which the illumination of the image sensor 13 rises to 90% of its saturation level, as shown by the curve A of FIG. 6. At that level, the program variable FLASH is not incremented further and subsequent flash pulses provide a constant amount of illumination, for a flicker-free video signal.

Assume now that the density of the original film negative is intermediate to low, so that excessive illumination of the image sensor 13 occurs based upon the initial value of the program variable FLASH. In particular, assume that the initial flash illumination saturates the image sensor 13. In this situation, the microprocessor, in response to the TOO FULL signal, decrements the variable FLASH by one. With the initial value of FLASH selected so that the signal HB is set at a logic one level, the number represented by the eight bits corresponding to the voltage VR is decreased by one. Thus, the next flash pulse is again produced with a 20-ampere firing current and, therefore, has approximately the same intensity as the first pulse. However, with a slightly shorter flash pulse due to the smaller value of VR, a slightly lower amount of illumination is produced.

The above-described flash-firing sequence is repeated during each vertical retrace interval of a television signal until the program variable FLASH is decremented to a level corresponding to a 20-ampere flash pulse having a minimum acceptable duration (approximately 200 $\mu$s) or until the illumination of the image sensor falls to 95% of its saturation level, whichever occurs first.

If the latter occurs, the program variable FLASH is not decremented any further, and subsequent flash pulses are produced with the 20-ampere firing current.

When the anticipated duration of a flash pulse decreases to the aforementioned minimum acceptable level and the illumination of the image sensor 13 is still above 95% of its saturation level, as shown by the curve B of FIG. 6, the microprocessor, under the control of its program, sets the signal HB at a logic zero level. This condition disables the AND gate 124 of the logic illumination circuitry 62, which prevents the control signal OH from going high. Thus, the power MOSFET 82 responsive to the signal OH is turned off, which limits the flash-firing current to ten amperes.

With the signal HB set at a logic zero level, the flash pulse immediately following the flash of minimum duration at twenty amperes is produced with a 10-ampere firing current and, therefore, has an intensity lower by about a factor of four. As shown by the curve C of FIG. 6, the duration of the first low-intensity light pulse, however, is about four times as long, due to the reduction in flash intensity with the change in firing current from twenty to ten amperes. Although there is a discontinuity in the magnitude of the flash-firing current, the flash energy produced with the first pulse of 10-ampere current is approximately equal to the flash energy produced with the last pulse of 20-ampere current. Thus, there is no visible flicker in the television signal.

With the signal HB now low, the above-described flash-firing sequences relating to the decrementing of the variable FLASH continue to be repeated at the vertical retrace rate. Thus, a 10-ampere flash-firing current produces subsequent flash pulses of progressively less flash illumination due to the successively smaller values of VR.

The flash illumination decreases accordingly, to a point at which the illumination of the image sensor 13 eventually falls to 95% of its saturation level. At that level, the variable FLASH is not decremented further, and subsequent flash pulses produce the same amount of illumination.

By providing for the illumination of the image sensor 13 near its saturation level, without the illumination saturating the sensor, the signal-to-noise ratio of the image sensor is optimized, regardless of the density of the film negative. Additionally, the darkest area (scene highlight) of the portion of a given negative being displayed may change with the zooming and/or cropping of the negative 14. Thus, the amount of illumination required to optimize the signal-to-noise ratio of the image sensor 13 would also change. By providing for an adjustment of the illumination at the vertical field rate, the amount of illumination required to optimize the operation of the image sensor can be varied automatically whenever the flash illumination requirements of the film video player/printer 10 are caused to change with the position of the negative.

Although the invention has been described in detail with reference to the figures, it will be appreciated that variations and modifications are possible within the spirit and scope of the invention.

What is claimed is:

1. In a film video player having a quenchable electronic strobe light for illuminating a solid state image sensor by way of projecting a pulse of light via a photographic film onto said image sensor during the vertical retrace interval of a standard television signal, the photographic film having an average density which potentially falls within a first given range above or a second given range below the average density of a properly exposed photographic film, and photosensitive means arranged to produce a light-dependent signal corresponding to the intensity of the light pulse produced by said electronic strobe light, the improvement wherein:

(a) logic switching means, operatively coupled to said electronic strobe light, for adjusting the amplitude and the duration of a flash-firing current through said electronic strobe light to adjust the intensity of the light pulse;

(b) electronic computer means, responsive to an output of said image sensor, for producing an exposure level signal which is functionally related to the density of the photographic film, and which is thereby functionally related to the energy of the light pulse projected onto said image sensor during the vertical retrace interval; and (c) illumination control circuitry, operatively coupling sid electronic computer means, said photosensitive means, and said logic switching means and responsive to the exposure level signal and to the light-dependent signal, for causing said logic switching means to adjust both the amplitude and the duration of the flash-firing current through said electronic strobe light to produce a series of light pulses of substantially constant energy at the vertical retrace rate of the standard television signal, the amplitude and the duration of the current being cooperatively controlled so that, whenever the average density of the photographic film is within the first or the second given range, the duration of each light pulse is adjusted so that it (1) is greater than a minimum acceptable duration below which the energy of the light pulse cannot accurately be repeated, and (2) is less than a maximum acceptable duration which is no greater than the vertical retrace interval.

2. A film video player as defined in claim 1 wherein said logic switching means includes current-regulating means for adjusting the amplitude of the flash-firing current to (1) a first discrete level when an extreme density of the photographic film is above a first given magnitude, and (2) a second discrete level when the extreme density of the photographic film is below a second given magnitude.

3. A film video player as defined in claim 2 wherein said image sensor causes a video monitor to display an image of the photographic film and wherein said illumination control circuitry causes said logic switching means to adjust the duration of each of said series of light pulses in a manner that is functionally related to the amplitude of the flash-firing current such that there is no perceptible variation in the film image displayed on said video monitor when the flash-firing current is changed from one of the discrete levels to the other of the discrete levels.

4. A film video player as defined in claim 3 wherein said logic switching means is able to adjust the duration of the light pulse produced by said electronic strobe light from the minimum acceptable duration to the maximum acceptable duration when said current-regulating means adjusts the amplitude of the flash-firing current to either of the first or the second discrete levels, and wherein the first given range and the second given range together represent five stops of exposure variation in the photographic film.

5. A film video player as defined in claim 3 wherein said current-regulating means includes a pair of switchable current driver circuits connected in parallel, each of said driver circuits having a first conducting operating state and a second non-conducting operating state, the operating state of one of said driver circuits being separately controlled from the operating state of the other of said driver circuits to make it possible to adjust the amplitude of the flash-firing current through said electronic strobe light.

6. A film video player as defined in claim 5 wherein each of said current driver circuits is operated to draw a predetermined regulated amount of current through said electronic strobe light.

* * * * *

UNITED STATES PATENT OFFICE
CERTIFICATE OF CORRECTION

PATENT NO. : 4,688,099
DATED : August 18, 1987
INVENTOR(S) : D. L. Funston, et al It is certified that error appears in the above-identified patent and that said Letters Patent are hereby corrected as shown below:

| | |
|---|---|
| Title Page, Inventor: | --Richard A. Shroyer and David A. Johnson-- should be added as joint inventors. |
| Column 7, line 16 | "circitry" should be --circuitry-- |
| Column 13, line 37 | "18" should be --118-- |
| Column 16, line 14 | "sid" should be --said-- |

Signed and Sealed this

Twenty-ninth Day of December, 1987

Attest:

DONALD J. QUIGG

Attesting Officer

Commissioner of Patents and Trademarks